United States Patent
Sikka et al.

[11] Patent Number: 6,002,110
[45] Date of Patent: Dec. 14, 1999

[54] METHOD OF USING INFRARED RADIATION FOR ASSEMBLING A FIRST COMPONENT WITH A SECOND COMPONENT

[75] Inventors: Vinod K. Sikka, Oak Ridge; Barry G. Whitson, Corryton; Craig A. Blue, Knoxville, all of Tenn.

[73] Assignee: Lockheed Martin Energy Research Corporation, Oak Ridge, Tenn.

[21] Appl. No.: 09/143,032

[22] Filed: Aug. 28, 1998

Related U.S. Application Data

[62] Division of application No. 09/008,204, Jan. 16, 1998, abandoned.

[51] Int. Cl.$^6$ .............. F27B 19/04; F27D 11/02; B29C 65/14
[52] U.S. Cl. .......... 219/411; 219/390; 392/416; 264/249; 264/343
[58] Field of Search ................... 219/390, 411; 392/411, 416; 264/249, 319, 343, 479, 481, 492, DIG. 65, DIG. 66, DIG. 76; 156/272.2, 273.3, 379.6, 380.9, 304.6

[56] References Cited

U.S. PATENT DOCUMENTS

| | | | |
|---|---|---|---|
| 1,234,499 | 7/1917 | Smalley . | |
| 1,730,373 | 10/1929 | Kideney | 392/416 |
| 2,056,156 | 10/1936 | Buckingham et al. | 219/19 |
| 2,076,485 | 4/1937 | Streysman et al. | 219/35 |
| 2,282,070 | 5/1942 | Mahannah | 34/150 |
| 2,737,945 | 3/1956 | Nuss | 126/226 |
| 2,836,696 | 5/1958 | Ratchford | 219/35 |
| 3,240,915 | 3/1966 | Carter et al. | 219/343 |
| 3,361,895 | 1/1968 | Achner | 219/385 |
| 3,541,293 | 11/1970 | MacDonald et al. | 219/390 |
| 3,548,146 | 12/1970 | Hoyland | 219/200 |
| 3,640,001 | 2/1972 | Ellison | 34/218 |
| 3,747,226 | 7/1973 | Graffius | 34/104 |
| 3,887,992 | 6/1975 | Parmann | 264/249 |
| 4,048,281 | 9/1977 | Brummett et al. | 264/249 |
| 4,511,788 | 4/1985 | Arai et al. | 219/405 |
| 4,780,259 | 10/1988 | Buttry et al. | 264/249 |
| 5,060,289 | 10/1991 | Abramson | 392/423 |
| 5,097,890 | 3/1992 | Nakao | 165/39 |
| 5,556,497 | 9/1996 | Murphy et al. | 156/304.6 |
| 5,636,320 | 6/1997 | Yu et al. | 392/416 |
| 5,721,805 | 2/1998 | Cook et al. | 392/411 |

FOREIGN PATENT DOCUMENTS

| | | | |
|---|---|---|---|
| 618482 | 3/1927 | France | 219/521 |
| 3811357 | 10/1989 | Germany . | |
| 60-106179 | 6/1985 | Japan | 392/416 |
| 62-94925 | 5/1987 | Japan | 392/416 |
| 6-134869 | 10/1992 | Japan . | |
| 357689 | 1/1973 | U.S.S.R. | 392/416 |
| 614303 | 1/1978 | U.S.S.R. | 219/405 |
| 1286344 | 1/1987 | U.S.S.R. | 219/390 |

*Primary Examiner*—Joseph Pelham
*Attorney, Agent, or Firm*—Joseph A. Marasco

[57] ABSTRACT

A method of assembling a first component for assembly with a second component involves a heating device which includes an enclosure having a cavity for inserting a first component. An array of infrared energy generators is disposed within the enclosure. At least a portion of the first component is inserted into the cavity, exposed to infrared energy and thereby heated to a temperature wherein the portion of the first component is sufficiently softened and/or expanded for assembly with a second component.

13 Claims, 3 Drawing Sheets

METHOD OF USING INFRARED RADIATION FOR ASSEMBLING A FIRST COMPONENT WITH A SECOND COMPONENT

CROSS-REFERENCE TO RELATED APPLICATIONS

This application is a DIVISIONAL application of U.S. patent application Ser. No. 09/008,204 filed on Jan. 16, 1998, now abandoned, entitled "Infrared Boot Heater Assembly," the entirety of which is incorporated herein by reference.

The United States Government has rights in this invention pursuant to contract no. DE-AC05-96OR22464 between the United States Department of Energy and Lockheed Martin Energy Research Corporation.

FIELD OF THE INVENTION

The present invention relates to devices and methods of heating a specific portion of a first component in order to facilitate assembly with another component, and more particularly to such devices and methods wherein infrared energy is generated and used to heat the first component prior to assembly.

BACKGROUND OF THE INVENTION

In various types of industry, components are assembled by pressing together wherein a first component having a cavity is assembled with a second component which slides into the cavity of the first component. One of the components is generally characterized by a usually known degree of elasticity, and is stretched or compressed to a usually known degree during assembly, and remains in a stretched or compressed condition to grip or force against the other component in order to maintain assembly with the other component.

For example, in the automotive industry, tubular elastic (usually polymer) boots are assembled over metal components by manually forcing the elastic component over the metal component, usually with the aid of a lubricant. Other methods include heating in a convection heater or via direct contact with a hot fluid. Disadvantages thereof include time required for the operation, inefficient heating of components which results in waste heat generated into the work environment, worker fatigue, and costs involved in the use of a lubricant.

Of particular interest are methods employed in the assembly of polymer boots onto automotive constant-velocity (CV) joints. Presently, statistics indicate that at least 17,000 boots are assembled by hand onto CV joint components daily using lubricants and force.

OBJECTS OF THE INVENTION

Accordingly, objects of the present invention include the provision of devices and methods of assembling a first component with a second component while minimizing time requirement, minimizing waste heat generated into the work environment, minimizing worker fatigue, and minimizing or eliminating the need for use of a lubricant.

Further and other objects of the present invention will become apparent from the description contained herein.

SUMMARY OF THE INVENTION

In accordance with one aspect of the present invention, the foregoing and other objects are achieved by a device for heating an component including an enclosure defining a cavity for inserting a component; and an array of infrared energy generators disposed within the enclosure and arranged so that at least a portion of a component inserted into the cavity is exposable to infrared energy generated by the array.

In accordance with another aspect of the present invention, a method of assembling a first component for assembly with a second component includes the steps of: providing a heating device including an enclosure defining a cavity for inserting a first component, an array of infrared energy generators disposed within the enclosure and arranged so that at least a portion of the first component inserted into the cavity is exposable to infrared energy generated by the array; inserting at least a portion of the first component into the cavity to expose the portion of the first component to infrared energy generated by the infrared energy generators so that the portion of the first component is heated to a temperature wherein the portion of the first component is sufficiently softened and/or expanded for assembly with a second component; removing the portion of the first component from the cavity; and assembling the first component with the second component.

For a better understanding of the present invention, together with other and further objects, advantages and capabilities thereof, reference is made to the following disclosure and appended claims in connection with the above-described drawings.

DETAILED DESCRIPTION OF THE INVENTION

The present invention is applicable to boots and other components such as seals, dust covers, gaskets, handles, fasteners, mechanism components, and the like. Such components can be comprised of any material exhibiting elasticity and which also is softenable and/or expandable via infrared heating thereof.

In accordance with a particular embodiment of the present invention, a device and method are described wherein elastic components, for example, polymer boots, are exposed to and efficiently heated by infrared energy. The device directs energy generated thereby efficiently to the component, with minimal heat transferred to the work environment. The device is "cold-walled"—the enclosure containing the infrared chamber is not substantially heated. Moreover, only the portion of the part that needs to be heated will be heated.

Figure 1:
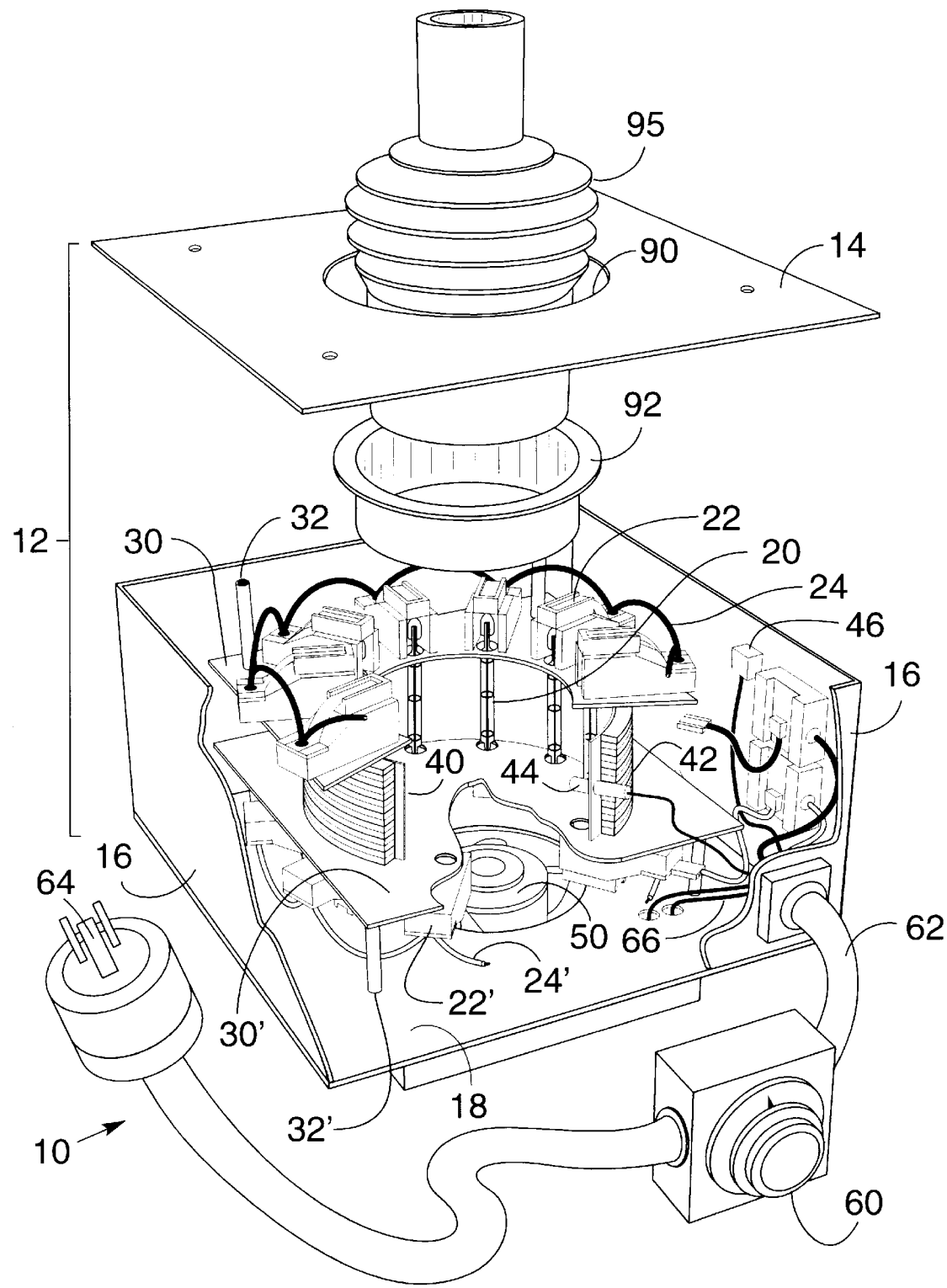
FIG. 1 is an oblique cutaway view of a partially disassembled boot heater in accordance with an embodiment of the present invention.
Figure 2:
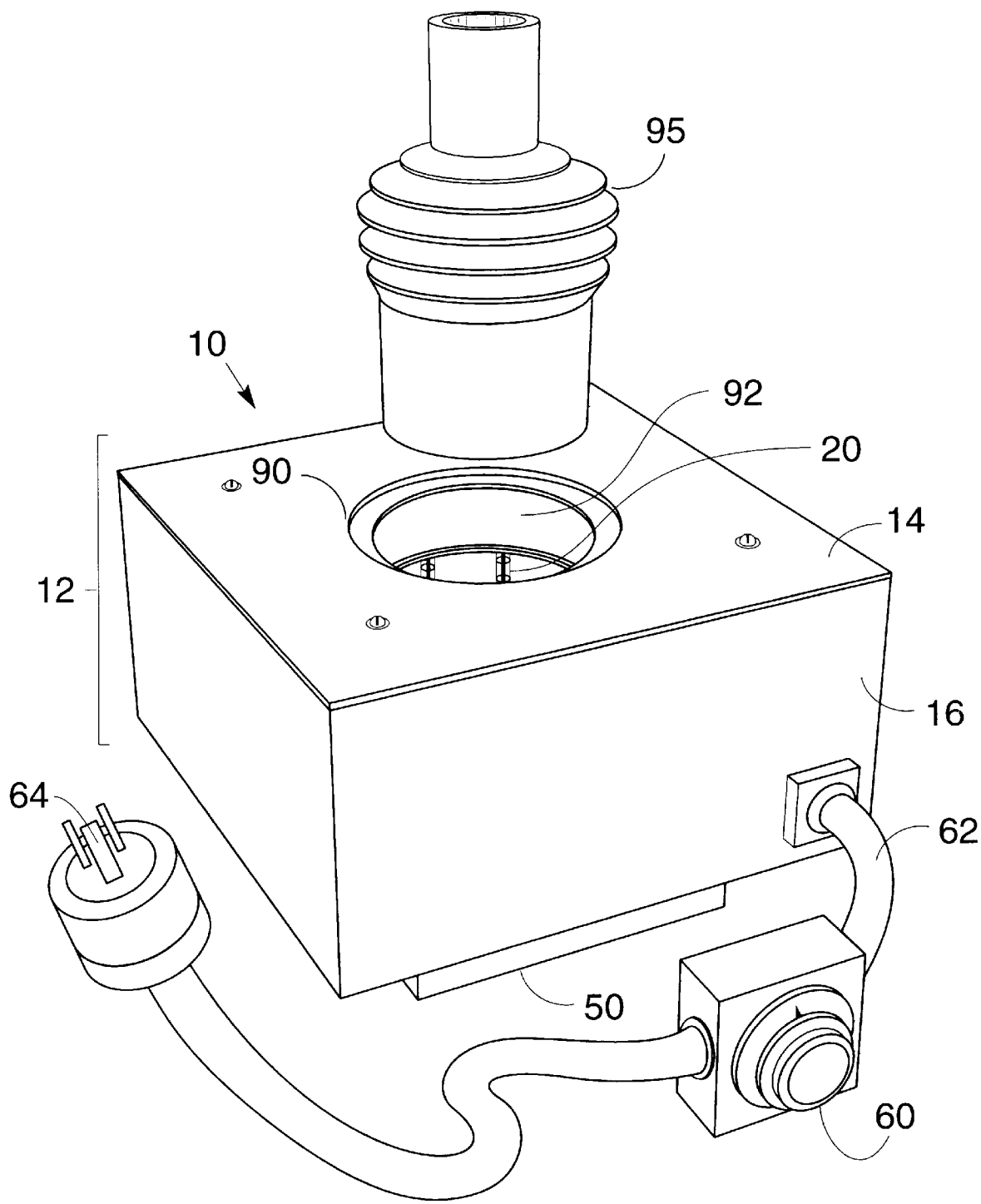
FIG. 2 is an oblique view of a boot heater in accordance with an embodiment of the present invention.

Referring to FIGS. 1 and 2, an embodiment of the present invention is described which is suitable for assembling polymer boots onto CV joints.

A boot heater 10 is structurally supported by an enclosure 12 which comprises top 14, sides 16, and bottom 18. An array of incandescent lamps 20, preferably of the tungsten halogen type, is mounted within the enclosure 12 and supported thereby. Each lamp 20 is supported by a pair of conventional respective upper and lower lamp supports 22, 22' and electrically connected by conventional respective upper and lower electrical connections 24, 24'. Lamp supports 22, 22' are respectively arranged on and supported by upper and lower support plates 30, 30' which are fastened to the enclosure 12 by respective upper and lower standoff supports 32, 32'. The array of lamps 20 are surrounded by a reflector 40 which can be of straight (shown), elliptical, parabolic, or any other suitable cross section to reflect infrared energy as desired. The reflector 40 is supported by upper and lower support plates 30, 30'. The back of the reflector 40 is preferably covered with insulation 42.

The top 14 defines an opening 90 for inserting a boot 95 into the heater where the boot 95 is surrounded by of the array of lamps 20. The top 14 or the lower support plate 30' acts as a stop to allow insertion of the boot 95 only to a preselected depth into the enclosure 12. A tubular shield 92 can optionally be located around the opening 90 and down to the upper support plate 30 to cover the upper electrical connections 24.

Cooling means such as an exhaust fan 50 and/or vent openings (not illustrated) direct air through the enclosure 12 to remove any residual heat that is not absorbed by the boot 95. The exhaust fan 50 is preferably mounted on the bottom 18 to provide balanced airflow through the enclosure 12. The exhaust fan 50 can be controlled by a thermostat 46. Cooling means can optionally comprise a static or flowing liquid or any other conventional cooling method and/or device which is suitable for cooling a device as described herein.

Controlled power is supplied to the lamps via a controlled power supply 60 in order to control the amount of infrared energy generated thereby. Conventional wiring 62 is used to electrically connect the electrical connections 24, 24' of the lamps 20 to the controlled power supply 60 and thence to a power source 64. The controlled power supply 60 can comprise a manual controller. The controlled power supply 60 can comprise electrical and/or electronic control systems, for example, an optical pyrometer temperature sensor 44 in operative relationship with the heater and coupled with a silicon-controlled-rectifier (SCR)/controller system located within the controlled power supply 60. Moreover, the controlled power supply 60 can comprise a mechanical, electrical and/or electronic time-delay control system.

The controlled power supply 60 can be fully automated via conventional automation technology, as can the entire device and the process of heating and assembling components.

Electrical connection 66 to the exhaust fan 50 can bypass the controlled power supply 60 and be connected directly to the power source 64.

EXAMPLE I

A boot heater was constructed as described hereinabove. A polymer boot was inserted into the boot heater so that a portion of the boot that is generally assembled onto a CV joint was within the cavity and exposable to the array of lamps therein, the remaining portion of the boot remaining outside of the boot heater. The boot heater was energized for 12 seconds to expose an outer surface of the portion of the boot to infrared energy. The boot was immediately removed and the temperature of the exposed portion thereof was measured at 260° F., a temperature at which the polymer material thereof was suitably softened/expanded for assembly onto a respective CV joint.

Methods of heating CV joint boots and other components for assembly can vary within the scope of the present invention. For example, voltage to the infrared energy generator and time of exposure to the infrared energy can be varied in order to heat components to various temperatures. Some experimentation is usually desirable in order to optimize voltage and exposure time for a particular component.

Figure 3:
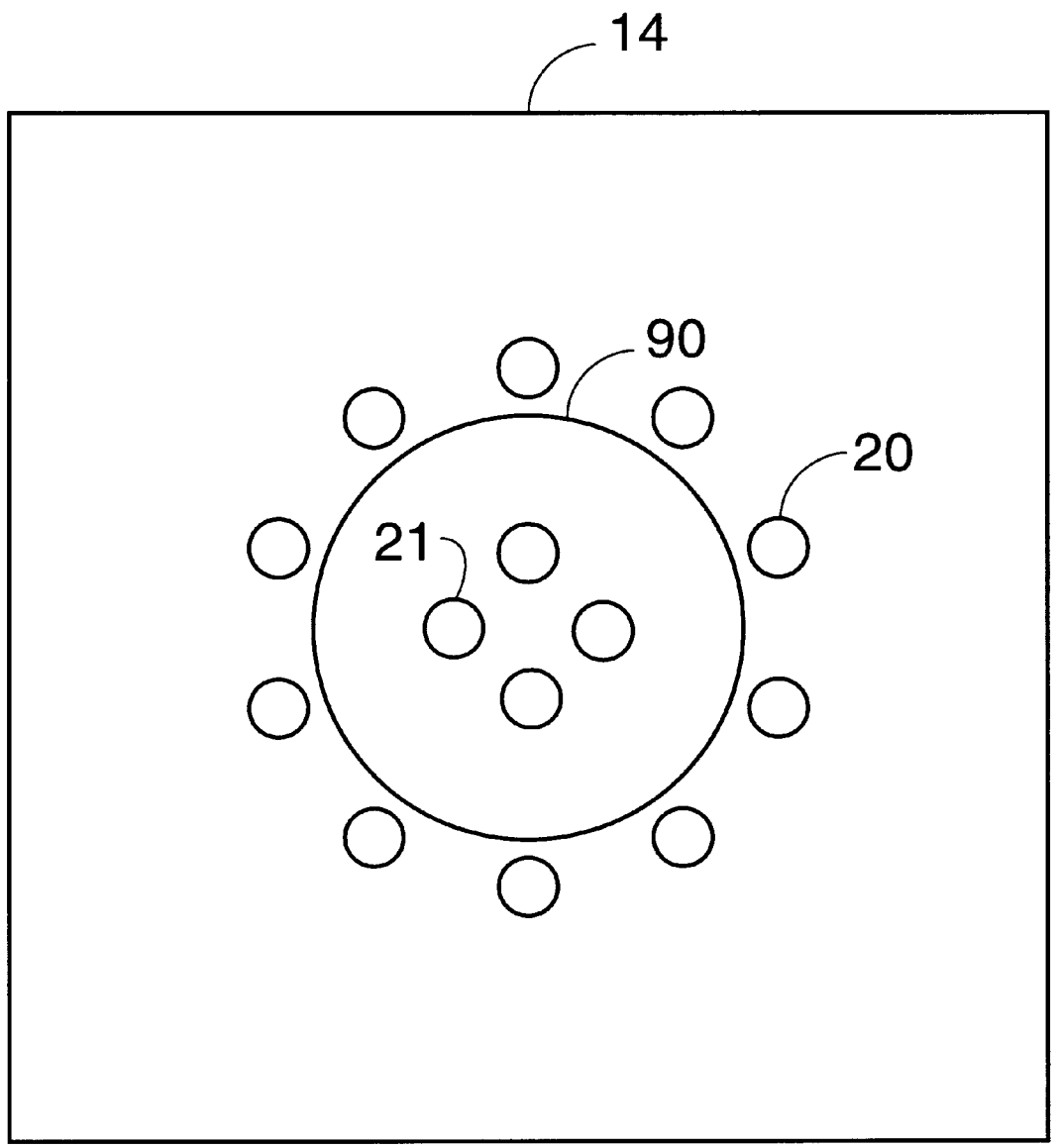
FIG. 3 is a schematic top view of a boot heater in accordance with an embodiment of the present invention.

Moreover, the number of lamps in the array can be modified to increase or decrease the amount of infrared energy generated. For example, the boot heater in FIG. 1 can be modified as shown schematically in FIG. 3 to have a second array of lamps 21 within the cavity so that when a boot is inserted therein, the second array of lamps 21 will be inside the boot, and will heat the boot from the inside by exposing an inner surface thereof to infrared energy. An advantage of such an arrangement is that the boot will be heated to the desired temperature faster, and with the result of a more even heating of inside and outside surfaces of the boot.

Moreover, the device can be modified to accept components of various sizes and/or shapes by removing the top 14 and shield 92 and replacing the same with others of desired size/shape.

While there has been shown and described what are at present considered the preferred embodiments of the invention, it will be obvious to those skilled in the art that various changes and modifications can be made therein without departing from the scope of the inventions defined by the appended claims.

What is claimed is:

1. A method of assembling a first component for assembly with a second component comprising the steps of:
   a. providing a heating device comprising an enclosure defining a cavity for inserting a first component, an array of infrared energy generators disposed within said enclosure and arranged so that at least a portion of said first component inserted into said cavity is exposable to infrared energy generated by said array;
   b. inserting at least a portion of said first component into said cavity to expose said portion of said first component to infrared energy generated by said infrared energy generators so that said portion of said first component is heated to a temperature wherein said portion of said first component is sufficiently at least one of softened and expanded for assembly with a second component;
   c. removing said portion of said first component from said cavity; and
   d. assembling said first component with said second component.

2. A method in accordance with claim 1 wherein said first component comprises an elastic material.

3. A method in accordance with claim 1 wherein said first component comprises a polymer boot.

4. A method in accordance with claim 3 wherein said second component comprises a CV joint.

5. A method in accordance with claim 1 wherein said infrared energy generators comprise incandescent lamps.

6. A method in accordance with claim 1 wherein said array surrounds said cavity so that an outer surface of said portion of said first component is exposed to infrared energy.

7. A method in accordance with claim 6 further comprising another array disposed within said cavity so that an inner surface of said portion of said first component is exposed to infrared energy.

8. A method in accordance with claim 1 further comprising the additional step of controlling the amount of infrared energy generated by said array.

9. A method in accordance with claim 8 wherein said additional step of controlling the amount of infrared energy is accomplished by controlling means comprising a temperature sensor.

10. A method in accordance with claim 9 wherein said temperature sensor comprises an optical pyrometer.

11. A method in accordance with claim 1 further comprising the additional step of removing residual heat from said heating device.

12. A method in accordance with claim 11 wherein said additional step of removing residual heat is accomplished by cooling means comprising a fan.

13. A method in accordance with claim 11 wherein said additional step of removing residual heat is accomplished by cooling means which are thermostatically controlled.

\* \* \* \* \*